United States Patent
Viola

(10) Patent No.: US 7,055,399 B2
(45) Date of Patent: Jun. 6, 2006

(54) UNSHUNTED COLLARLESS TORSION SHAFT FOR ELECTRONIC POWER-ASSISTED STEERING SYSTEMS

(75) Inventor: Jeffrey Louis Viola, Berkley, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 26 days.

(21) Appl. No.: 10/427,254

(22) Filed: May 1, 2003

(65) Prior Publication Data

US 2004/0216533 A1    Nov. 4, 2004

(51) Int. Cl.
*G01L 3/02* (2006.01)

(52) U.S. Cl. .................................... 73/862.335

(58) Field of Classification Search .............................. 73/862.331–862.336, 862, 862.08
See application file for complete search history.

(56) References Cited

U.S. PATENT DOCUMENTS

| | | | | |
|---|---|---|---|---|
| 4,414,855 | A | * | 11/1983 | Iwasaki ................. 73/862.335 |
| 4,627,298 | A | * | 12/1986 | Sahashi et al. ......... 73/862.336 |
| 4,711,134 | A | * | 12/1987 | Kita ....................... 73/862.333 |
| 4,817,444 | A | * | 4/1989 | Yagi et al. ............. 73/862.335 |
| 5,052,232 | A |  | 10/1991 | Garshelis ................. 73/862.36 |
| 5,115,685 | A | * | 5/1992 | Jorgensen et al. ..... 73/862.331 |
| 5,782,149 | A | * | 7/1998 | Jensen ......................... 81/125 |
| 6,047,605 | A |  | 4/2000 | Garshelis .............. 73/862.336 |
| 6,260,423 | B1 |  | 7/2001 | Garshelis .............. 73/862.336 |
| 6,341,534 | B1 | * | 1/2002 | Dombrowski .......... 73/862.333 |
| 6,360,841 | B1 | * | 3/2002 | Blandino et al. ........... 180/443 |
| 6,863,614 | B1 | * | 3/2005 | Viola .......................... 464/23 |
| 2002/0189372 | A1 | * | 12/2002 | Wallin et al. .......... 73/862.333 |

FOREIGN PATENT DOCUMENTS

JP    10176966 A  *  6/1998

OTHER PUBLICATIONS

I.J. Garshelis et al, *A Torque Transducer Based on Local Bands of Naturally Stabilized Remanent Circumferential Magnetization,* Journal of Applied Physics, 85:5468-70 (1999).

* cited by examiner

*Primary Examiner*—Max Noori
(74) *Attorney, Agent, or Firm*—Brinks Hofer Gilson & Lione

(57) ABSTRACT

There is provided a torsion shaft for the electronic power-assisted steering ("EPAS") system of a vehicle. The torsion shaft designed for the EPAS system is made up of a shaft, where a first portion of the shaft is magnetized, and a second portion of the shaft is non-magnetized. The torsion shaft further includes a torsion cap attached to the shaft. Also provided is a torsion shaft for an EPAS system made up of a discreet first shaft portion and a discreet second shaft portion operatively joined together, where the first shaft portion is magnetized, and a second shaft portion is non-magnetized. The torsion shaft further includes a torsion cap attached to the shaft. Further provided is a method for making a torsion shaft where at least two portions of a torsion shaft are provided. At least one portion is magnetized, and at least one portion is left free of magnetization. The portions are then joined.

4 Claims, 3 Drawing Sheets

UNSHUNTED COLLARLESS TORSION SHAFT FOR ELECTRONIC POWER-ASSISTED STEERING SYSTEMS

BACKGROUND OF THE INVENTION

In control of systems having rotating drive shafts, such as an electronic power-assisted steering system ("EPAS system"), the amount of torque applied to the drive shaft is an important parameter for control feedback. Therefore, the sensing and measurement of torque in an accurate, reliable and inexpensive manner has been a primary objective. For this purpose, non-contacting magnetoelastic torque transducers have been developed.

These non-contact torque sensors, as shown in U.S. Pat. No. 4,896,544, disclose a sensor comprising a torque carrying member, with an appropriately ferromagnetic and magnetoelastic surface, two axially distinct circumferential bands within the member that are endowed with respectively symmetrical, helically directed residual stress induced magnetic anisotropy, and a magnetic discriminator device for detecting, without contacting the torqued member, differences in the response of the two bands to equal, axial magnetizing forces. Most typically, magnetization and sensing are accomplished by providing a pair of excitation or magnetizing coils overlying and surrounding the bands, with the coils connected in series and driven by alternating current. Torque is sensed using a pair of oppositely connected sensing coils for measuring a difference signal resulting from the fluxes of the two bands. Unfortunately, providing sufficient space for the requisite excitation and sensing coils on and around the device on which the sensor is used has created practical problems in applications where space is at a premium. Also, such sensors appear to be impractically expensive for use on highly cost-competitive devices, such as in automotive applications.

More recently, torque transducers have been developed based on the principle of measuring the field arising from the torque induced tilting of initially circumferential remanent magnetizations. These transducers utilize a thin wall ring or collar serving as the field generating element. Tensile "hoop" stress in the ring, associated with the means of its attachment to the shaft carrying the torque being measured, establishes a dominant, circumferentially directed, uniaxial anisotropy. Upon the application of torsional stress to the shaft, the magnetization reorients and becomes increasingly helical as torsional stress increases. The helical magnetization resulting from torsion has both a circumferential component and an axial component, the magnitude of the axial component depending entirely on the torsion. One or more magnetic field vector sensors sense the magnitude and polarity of the field arising, as a result of the applied torque, in the space about the transducer and provides a signal output reflecting the signed magnitude of the torque. The stability of the "torque-to-field" transfer function of the transducer under rigorous conditions of use reflects the efficiency of uniaxial anisotropy in stabilizing circular polarizations. This anisotropy, together with the spatially closed nature of the quiescent polarization, is also the basis of an immunity from polarization loss in relatively large fields. While the fields that arise from the ring itself have only hard axis components relative to the anisotropy, "parasitic" fields from permeable material that is close enough to become magnetized by the ring field have no such limitation. The addition of such parasitic fields to the torque dependent field from the ring can seriously degrade the transfer function.

As a result, in order to avoid a major source of such distortion, either the underlying shaft, or a sleeve that is placed between the shaft and the ring, is generally fabricated from a paramagnetic material. In addition, inasmuch as the peak allowable torque in a ring sensor is limited by slippage at the ring/shaft interface, concerns have been expressed regarding distortion arising from slippage at the ring/shaft interface under conditions of torque overload. This need for multiple parts of different materials, together with the requirement that the methods and details of their assembly establish both a rigid, slip-free mechanical unit and a desired magnetic anisotropy, have encouraged the investigation of alternative constructions.

BRIEF SUMMARY OF THE INVENTION

According to one embodiment of the present invention, there is provided a torsion shaft for the electronic power-assisted steering ("EPAS") system of a vehicle. The torsion shaft for the EPAS system has a shaft, where a first portion of the shaft is magnetized, and a second portion of the shaft is non-magnetized. The torsion shaft further includes a torsion cap attached to said shaft.

According to another embodiment of the present invention, there is provided a torsion shaft for an EPAS system of a vehicle. The torsion shaft is made from two discreet shaft portions, one being magnetized, the other being non-magnetized. The two portions are operatively joined to each other to form a single shaft. The torsion shaft further includes a torsion cap attached to said shaft.

According to still another embodiment of the present invention, there is provided a method for making a torsion shaft for an EPAS system of a vehicle. At least two portions of a torsion shaft are provided. At least one of those portions is magnetized, while at least one of those portions is left free of magnetization. The two portions are then operatively joined to each other to form a single shaft.

Other aspects of the present invention will become apparent in connection with the following description of the preferred embodiments.

DETAILED DESCRIPTION OF THE PREFERRED EMBODIMENTS

The torsion shaft is referred to as unshunted and collarless. In other words, the torsion shaft of the present invention may operate without an extra magnetized collar. Typically, the collar is placed over the torsion shaft to generate the magnetic field used to measure torsion. Instead, the magnetic field arises from a selective magnetization of the torsion shaft itself. Such a shaft is particularly useful in an EPAS system. As discussed below, the shaft can be made of a lightweight, inexpensive, magnetizible material, resulting in a lower vehicle weight and a lower vehicle cost to consumers.

Figure 1:
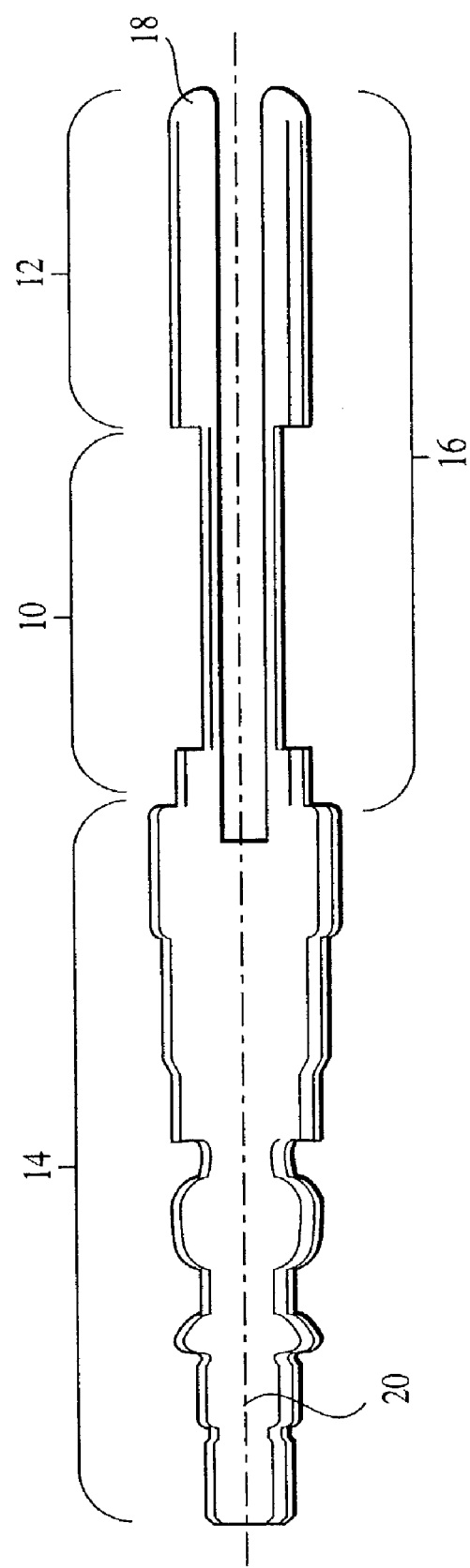
FIG. 1 is a cross-sectional diagram of the torsion shaft for an EPAS system of an embodiment of the present invention.

FIG. 1 is a cross-sectional diagram of an embodiment of a torsion shaft of the present invention. The embodiment of FIG. 1 comprises three portions: a magnetized shaft portion 10, a non-magnetized shaft portion 12, and a torsion cap 14. The magnetized shaft portion 10 and the non-magnetized shaft portion 12 comprise a single shaft 16, to which the torsion cap 14 is attached.

The torsion cap 14, as is known in the art, is designed to help facilitate a smooth yet secure connection between the torsion shaft and the other moving parts of the vehicle. The end of the torsion cap 14, indicated at 20, is therefore shaped with threads or teeth, as is depicted in FIG. 1. However, any shape able to keep a secure connection may be used. Additionally, the end of the shaft 16, as shown at 18, may also be of any shape necessary for a torsion shaft in an EPAS system. For example, the end pieces 18 and 20 may have grooves, so as to slide easily into another receiving part, or may have threads or teeth, so as to facilitate a connection with a gear or other rotating device. Other shapes known to those skilled in the art or later developed may be used.

The torsion cap 14 may be comprised of a non-ferromagnetic metal such as stainless steel. The torsion cap 14 is attached to the torsion shaft via a pin, welding, or by any other method known to one of skill in the art. In one embodiment, the torsion cap 14 is attached at the magnetized shaft portion 10.

The shaft 16 may be of any shape, such as a generally cylindrical or oval shape. The shaft 16 may also be solid or hollow, as dictated by weight, material, or design concerns. A hollow shape is shown in FIG. 1. The shaft 16 is formed from a single metal. In one embodiment, both the magnetized shaft portion 10 and the non-magnetized shaft portion 12 comprise one piece of a magnetoelastic metal such as T250 steel. In this embodiment, the magnetized shaft portion 10 is created by magnetizing a portion of the shaft 16. The magnetization may be performed by any method now known or later developed. The magnetized shaft portion 10 may comprise any portion of the shaft 16, such as between about 25% to about 75% of the length of the shaft 16. In one embodiment, the magnetized portion is about 45% to about 55% of the shaft. In another embodiment, the magnetized portion is about 50% of the shaft.

Figure 2A:
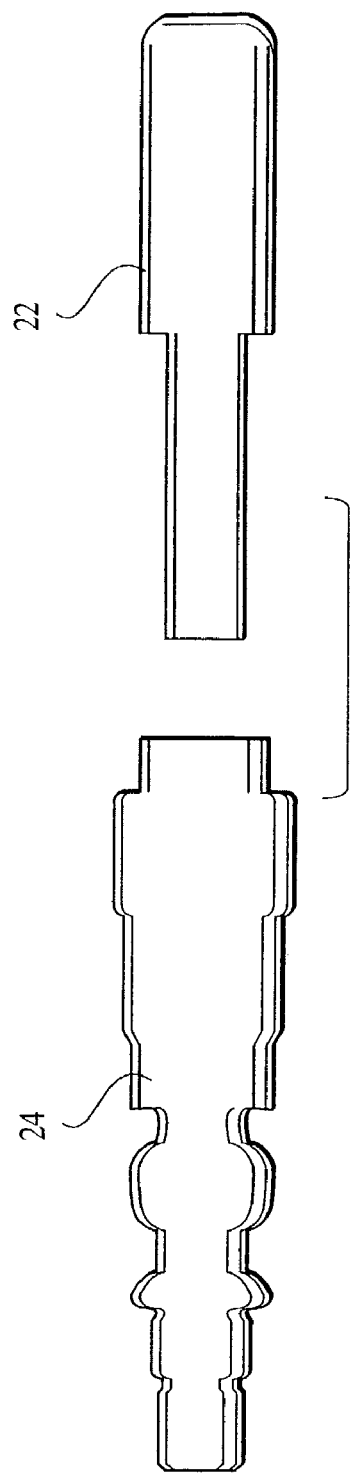
FIG. 2A is a diagram of a two-piece shaft of an alternative embodiment of the present invention.
Figure 2B:
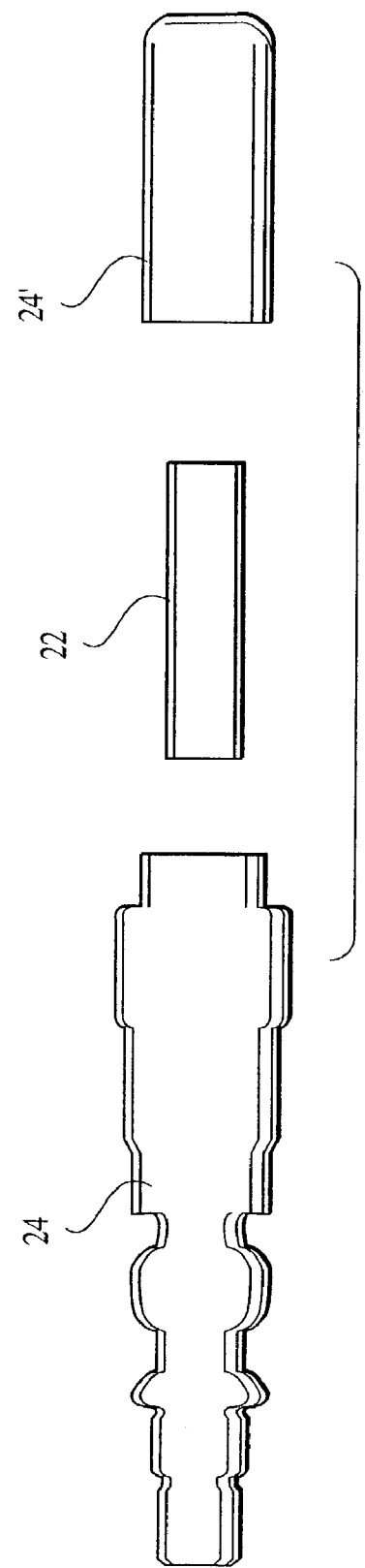
FIG. 2B is a diagram of a three-piece shaft of an additional alternative embodiment of the present invention.

In this embodiment, the magnetized shaft portion 10 and the non-magnetized shaft portion 12 are formed as an integral whole, but they may also be formed from two or more separate portions, joined by welding, gluing, pins, or any other joining method as known to one of skill in the art. For example, as shown in the embodiment FIG. 2A, the torsion shaft may comprise a magnetized piece 22 joined to an unmagnetized piece 24. A three-piece torsion shaft embodiment is shown in FIG. 2B, where a magnetized piece 22 is joined between two unmagnetized pieces 24 and 24'. While the magnetized piece 22 is made of a magnetoelastic material which is magnetized, such as T250 steel, the umagnetized pieces 24 may be made of an unmagnetized magnetoelastic material, or of a non-ferromagnetic material, such as stainless steel.

The active region is defined by the existence of the magnetizations indicated. The magnetized shaft portion 10 of the shaft is distinguishable from the non-magnetized shaft portion 12 by the absence (in such portions) of any appreciable magnetization. Thus, except for secondary reasons associated with other shaft functions, to visually identify the active region, or to optimize some feature of the transducer performance, neither the chemical composition, metallurgical condition, diameter, surface treatment or finish of the magnetized shaft portion 10 of the shaft are different from the non-magnetized shaft portion 12. For example, the magnetized shaft portion 10 is heat treated in order to optimize the transducing properties of the magnetized shaft portion 10. Heat treatment may change the metallurgical condition of the magnetized shaft portion 10 to be different from that of the unmagnetized shaft portion 12. This difference, however, may not be endemic to the processing of the shaft, but only to the optimization of the transducing power of the shaft.

Figure 3:
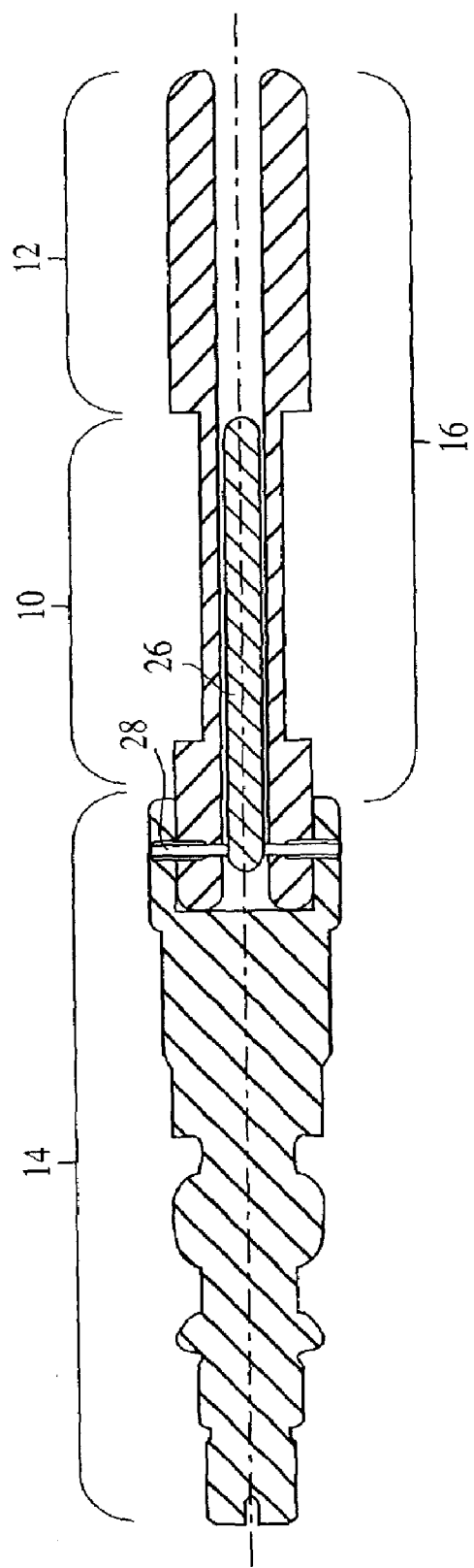
FIG. 3 is a cross-sectional diagram of the torsion shaft for an EPAS system of an embodiment comprising a magnetic field sensor of the present invention.

It is standard practice in the art to have a magnetic field sensor outside the shaft 16. FIG. 3 shows an embodiment of the shaft 16 which contains a magnetic field sensor 26 mounted within the shaft 16. In this embodiment, the shaft 16 is hollow. The magnetic field sensor 26 may be attached within the shaft 16 by any means now known or later developed. Preferably, a pin hole is created through the torsion cap 14 shaft 16, and magnetic field sensor 26, and a pin 28 is used to hold the components together.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims.

The invention claimed is:

1. A torsion shaft for the electronic power-assisted steering system of a vehicle comprising:
    a shaft, said shaft comprising a first portion and a second portion, said first portion being magnetized, and said second portion being non-magnetized, said shaft further comprising a magnetic field sensor located inside said shaft; and
    a non-magnetized torsion cap attached to said shaft.

2. The torsion shaft of claim 1, wherein said magnetic field sensor is attached to said shaft via a pin.

3. The torsion shaft of claim 1, wherein said magnetic field sensor comprises a non-ferromagnetic material.

4. The torsion shaft of claim 3, wherein said magnetic field sensor comprises a stainless steel.

* * * * *